United States Patent [19]

Buchner

[11] Patent Number: 4,928,994
[45] Date of Patent: May 29, 1990

[54] MOTOR VEHICLE WATER AND MUD SPLASH GUARD

[76] Inventor: Fritz Buchner, E 7, D-6800 Mannheim, Fed. Rep. of Germany

[21] Appl. No.: 292,177

[22] Filed: Dec. 30, 1988

Related U.S. Application Data

[63] Continuation-in-part of Ser. No. 109,926, Oct. 19, 1987, abandoned.

[51] Int. Cl.⁵ .......................... B60R 27/00; B62B 9/16
[52] U.S. Cl. .................................................. 280/851
[58] Field of Search ............... 280/847, 848, 849, 154, 280/851

[56] References Cited

U.S. PATENT DOCUMENTS 3,158,386 11/1964 Tillinghast et al. ................. 280/851
3,195,920 7/1965 Knisely et al. ...................... 280/851
4,453,728 6/1984 Verge .................................. 280/851

FOREIGN PATENT DOCUMENTS 2431412 3/1980 France ................................ 280/851

Primary Examiner—Charles A. Marmor
Assistant Examiner—Tamara L. Finlay
Attorney, Agent, or Firm—Klein & Vibber

[57] ABSTRACT

A splash guard for preventing or reducing throwing of water bursts from wheel boxes of power-driven vehicles during driving on wet roads. The guard has a two-wing guard member arranged to extend substantially over the entire transverse width of a wheel box at its rear lower end as considered in a traveling direction. The guard is turnable about an axis and has one wing which, in mounted position, extends from the axis toward a road, and another wing which, in mounted position, extends toward a running surface of a wheel so as to form a guarding part.

3 Claims, 3 Drawing Sheets

4,928,994

MOTOR VEHICLE WATER AND MUD SPLASH GUARD

CROSS-REFERENCE FOR RELATED APPLICATION

This application is a continuation-in-part application of my pending application Ser. No. 109,926 filed on October 19, 1987, now abandoned.

BACKGROUND OF THE INVENTION

The present invention relates to a water and mud guard to be mounted on power vehicles for preventing or reducing throwing of water bursts from wheel boxes during traveling on wet roads. Devices of this general type are known in the art. The known devices are formed as a guard member which extends substantially over the whole width of the respective wheel box at its rear end, as considered in a traveling direction, and projects toward the running surface of the wheel which rotates in the respective wheel box so as to form a gap between the guard member and the running surface of the wheel.

One of such devices is disclosed in the French patent No. 2,431,412. The device disclosed in this patent is formed as a guard member which is firmly mounted in the road wheel box and corresponds ot the structural contours of the respective vehicle. For another type of vehicle, a different guard member must be designed. The widths of the gaps between the running surface of the vehicle wheel and the edge of the guard part which extends toward the running surface must be selected so that, on the one hand, an easy exchange of the wheel can be provided and, on the other hand, traveling with snow chains can take place. Correspondingly, the gap should not have too great a width which naturally affects the efficiency of the guard member and allows penetration of water particles, which can also carry dirt particles, into the wheel boxes.

SUMMARY OF THE INVENTION

Accordingly, it is an object of the present invention to provide an improved splash guard for motor vehicles for preventing or reducing throwing of water bursts from wheel boxes during traveling on wet roads, which is easily adjustable to the structural particularities of respective vehicles, and which makes possible an ajustment to the requirement of winter driving with snow chains.

In keeping with these objects and with others which will become apparent hereinafter, one feature of the present invention resides, briefly stated, in a device which is formed as a two-wing guard member turnably arranged at the rear lower end of the wheel box as considered in a traveling direction, wherein one wing of the guard member extends from a turning axis downwardly to a road, while the other wing extends from the turning axis toward a running surface of the vehicle wheel to form a guarding part.

When the device is designed in accordance with the present invention, vehicles can be equipped with them without a special construction for the wheel boxes. In a simple manner, an adjustment of the wing which extends toward the running surface of the wheel and forms the guarding part is possible, so that more or less, a narrow gap is formed between this wing and the running surface. Thereby penetration into the wheel box of water and dirt particles which are thrown from a rotating vehicle wheel is prevented with high efficiency. The wing which extends toward the road forms an effective protection for a vehicle which follows the guide member-equipped vehicle in traffic.

A turnable connection for a splash guard member is mounted on a holding part which is formed in a wheel box so that the pivot axis for the splash guard extends in the region of the rear lower edge of the wheel box. This feature is disclosed in U.S. Pat. No. 4,453,728. However, this device does not have a guarding part which extends approximately radially toward the running surface of the respective wheel for preventing penetration of water and dirt particles into the wheel box. In this device, a holding part on the respective wheel box is provided and has a cutout which corresponds to the running surface so that it extends partially outwardly around the vehicle wheel which rotates in the respective wheel box. An adjustment to different applications is not possible in this device.

The device in accordance with the present invention allows a particularly simple adjustment, for example, to the requirements of winter driving with snow chains. This is effected in the inventive device by adjusting the wing which extends toward the running surface of the respective vehicle wheel, with respect to the gap between this wing and the running surface.

When the device is designed in accordance with the present invention, it is possible during traveling on wet roads, when throwing of water bursts from the wheel boxes takes place in an especially pronounced manner, to suppress the water bursts by providing the narrowest possible gaps between the wing, which serves as a guarding part, and the running surface of the respective vehicle wheel. During winter driving, the adjustment is performed, on the contrary, to provide a maximum possible width of the gap to insure an easy passage of the snow chains.

In accordance with a further advantageous embodiment of the invention, the two wings are turnable about their common support axis relative to each other on the wheel box within a predetermined limit, and the two guard members are held in their respective working positions, so that the wing or member which extends toward the running surface of the vehicle wheel forms a predetermined gap relative to this running surface.

The gap between the wing of the splash guard and the running surface of the wheel is adjusted differently in the embodiments of FIGS. 3 and 4. In the embodiment of FIG. 3 the splash guard is of an integral unitary construction and both wings form a nonadjustable angle therebetween. In the embodiment of FIG. 4, in contradistinction thereto, the two wings are angularly adjustable by first threadably loosening and then, after the angular adjustment, threadably tightening the threaded bolt which forms the pivot support axle for both wings. In both embodiments, however, the operative position of the entire splash guard is determined by the angular positions assumed by both wings as a result a nut and bolt adjustment.

These features are desirable and advantageous in practical driving. Also in the embodiment of FIG. 4 both wings of the guard member can be adjustable relative to one another, so that in dependence on the respective adjustment of the wings, a respective smaller or larger gap width between the running surface of the wheel and the wing which extends toward the running surface can be insured for the conditions of respective applications.

The novel features of the present invention are set forth in particular in the appended claims. The invention itself, both as to its construction and its manner of operation, will be best understood from the following description of preferred embodiment in conjunction with the appended drawing.

DESCRIPTION OF PREFERRED EMBODIMENTS

Figure 1:
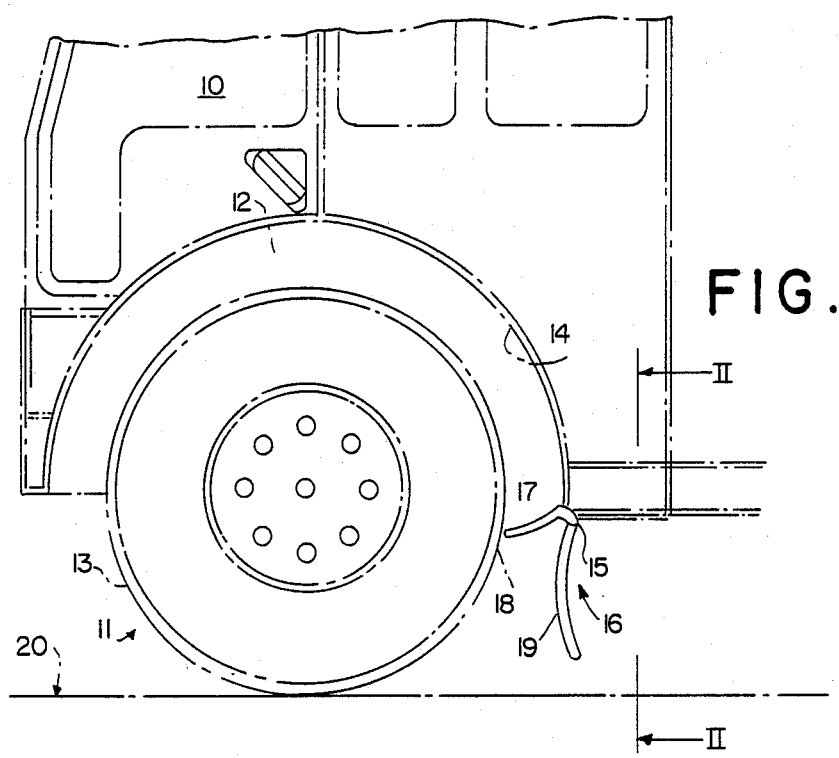
FIG. 1 is a side view of a front part of a truck in the region of a vehicle wheel and a wheel box, with a splash guard for preventing or reducing water bursts from the wheel box in accordance with the present invention.

In the vehicle which is partially shown in the drawing, a vehicle wheel 11 is rotatably mounted in a wheel box 14. The wheel box 14 extends above the vehicle wheel 11 equidistantly from the running surface 13 of the vehicle wheel over a peripheral region of approximately 180° and in any case in the region of the running surface. The wheel box 14 is covered inside and forms together with the vehicle a wheel wing passage 12.

The splash guard for preventing or at least reducing the ejection of water bursts from the wheel box is arranged at a lower edge 15 of the wheel box 14, which is a rear edge as considered in a traveling direction. The splash guard is formed as a two-wing guard flap 16. More particularly, the guard flap has a wing 17 which extends in the traveling direction somewhat downwardly and approximately radially to the vehicle wheel 11 so as to form a gap 18 with the running surface 13 of the vehicle wheel. The splash guard has also another wing 19 which extends substantially downwardly toward the roadway 20 and ends at a distance from it.

Figure 3:
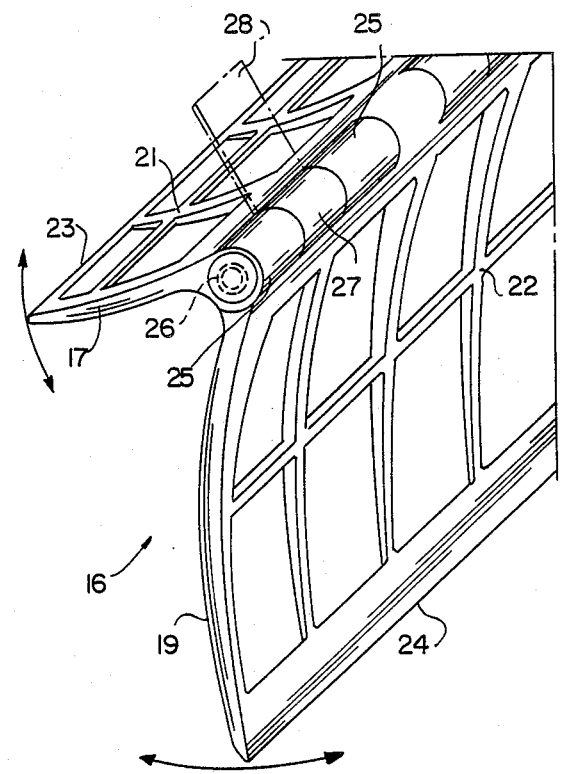
FIG. 3 is a prespective view showing a first embodiment of a splash guard in accordance with the present invention on an enlarged scale in which both wings of the splash guard form a unitary construction.

The two-wing splash guard 16, shown in FIG. 3 on an enlarged respective view, is formed as an angular unitary shaped member of rubber with reinforcement inserts formed in it by vulcanization and with both wings 17 and 19 forming one unit and extending from a common longitudinal edge.

The wings are provided on its outer sides with reinforcing ribs 21 and 22, respectively, and end in edges 23 and 24 which extend parallel to their common longitudinal edge 29. Both wings 17 and 19 of the guard flap 16 form a fixed angle therebetween of approximately 90°. On the side of the longitudinal edge 29 which faces away from the wings 17 and 19, a pivot axle 26 which defines a pivot axle concentric therewith, is received in collar parts 25. The pivot axle 26 holds between two neighboring collars 25, a hinge part 27 with a mounting tongue 28 extending from it. The mounting tongues 28 are adapted to be securely mounted adjacent to the lower edge 15 of the wheel base 14 as illustrated in FIGS. 1 and 2.

Figure 2:
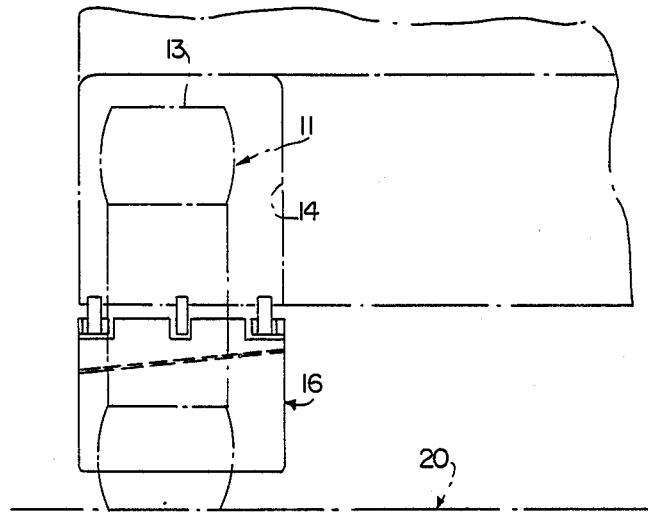
FIG. 2 is a view showing a fragment of the wheel box with the inventive device, as seen in direction of the arrow II in FIG. 1.

By means of the mounting tongues 28, the splash guard 16 is adjustably mounted in the manner shown in FIG. 2 and in the region of the rear lower edge 15 of the wheel box 14, as considered in the traveling direction, so that the pivot axle 26 extends horizontally and substantially parallel to the axis of rotation of the vehicle wheel 11 and the wing 17 extends toward the running surface 13 of the vehicle wheel 11. Thereby a gap with a small radial width is formed between the running surface of the vehicle wheel and the front edge 23 of the wing 17, spaced from the pivot axle.

During driving or rainy streets, the peripheral surface of the vehicle wheel 11 takes up water and dirt particles which are thrown backwards after contact is made between the running surface 13 and the roadway 20. A part of the thrown water and dirt particles is thrown underneath the wheel box downwardly, while another part is taken up by the rotating vehicle wheel 11. In vehicles without the inventive splash guard, a large part of the water and dirt particles are deposited under the wheel box 14.

For water particles which are deposited in the wheel box, the profile of the running surface of the rotating vehicle wheels 11 acts as a fan wheel. Thus, a transportation of the water particles mixed with dirt particles occured inside the similar passage 12 limited by the outer limits of the wheel box 14 and between the running surface of the vehicle wheel and the wheel box 14. Starting from the upper culmination point of the rotary path of the respective vehicle wheel, a pressure built up is produced with the result that the water particles with more or less dirt particles are thrown in strong atomized form sideways of the wheel box.

This effect is prevented by the inventive divice because the wing 17 of the guard flap 16 closes the lower rear side of the wheel box 14 with the exception of a gap 18, (FIG. 1) otherwise the water particles could move through the passage 12 between the wheel box 14 and the running surface 13 of the respective vehicle wheel 11. The gap 18 has only a small width between the running surface 13 of the vehicle wheel 11 and the edge 23 of the wing 17. The particles taken by the vehicle wheel are substantially pealed off and deflected at the lower side of the wing 17 in the direction toward the other vertically extending wing 19 which catches the particles thrown downwardly from the vehicle wheel and deflect them to the roadway 20.

Figure 5:
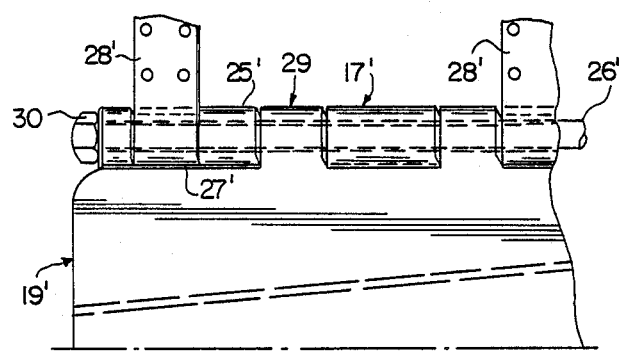
FIG. 5 is an enlarged rear partial view similar to the view of FIG. 2, but which shows only a detail of the embodiment of the splash guard of FIG. 4 in accordance with the present invention.
Figure 4:
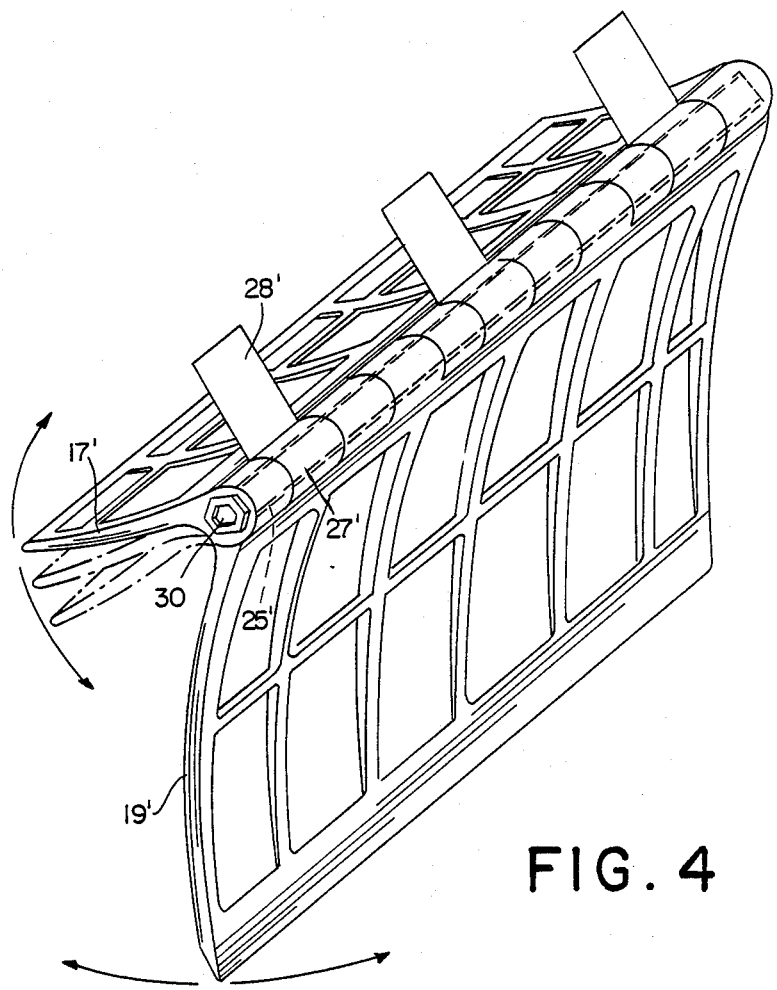
FIG. 4 is a perspective view of a second embodiment of a splash guard in accordance with the invention on an enlarged scale wherein the two wings are angularly adjustable relative to each other.

The embodiment shown in FIGS. 4 and 5 differs from the embodiment shown in FIG. 3. All those parts which are substantially equivalent to parts shown in FIG. 3 are designated with the same reference numerals but include a prime. Instead of the unitary one-piece construction of the splash guard, the wings 17' and 19' of the guard flap of this embodiment are articulately connected by means of their [hub] collar and hinge parts 25', 27' respectively to a common turning axle 26'. They are adjustable independently of one another by loosening a nut and the threaded bolt 30'. Moreover, several hinge parts 27' with mounting tongues 28' for mounting the device in the region of the rear lower edge of a vehicle box 14 as considered in the traveling direction, are arranged on the pivot axle 26' axially adjacent to each other. A tightening bolt 30' is provided at one end of the turning axle 26'. By loosening and then retightening the bolt 30' the wing 17' can be angularly adjusted relative to the wing 19' to assume various angular positions as illustrated in FIG. 4.

The invention is not limited to the details shown, since various modifications and structural changes are possible without departing in any way from the spirit of the present invention.

What is desired to be protected by Letters Patent is set forth in the appended claims.

I claim:

1. A splash guard for preventing or reducing throwing of water bursts from wheel boxes of a power driven vehicle during driving on wet roads, comprising
    a two-wing splash guard arranged to extend substantially over the entire width of a wheel box substantially parallel to the wheel axis of the vehicle at its rear lower end as considered in a traveling direction,
    each of said wings being adjustably mounted about a common support axis by means of threaded bolt and nut means,
    one wing extending from said axis in a predetermined mounted position from the wheel box toward a road surface, and another wing in a predetermined mounted position toward a running surface of a wheel so as to form a guarding part therefor.

2. A splash guard for preventing or reducing throwing of water and/or dirt particle bursts from a wheel box of a power-driven vehicle during driving on a road surface comprising in combination:
    a guard member including two wings, said wings subtending an angle therebetween, said guard member being arranged to extend substantially over the whole transverse width of the wheel box relative to the traveling direction of the vehicle and being arranged at a rear lower end of said wheelbox as considered in said traveling direction;
    means for adjustably mounting said guard member about a pivot axis extending substantially parallel to a wheel axis of rotation of the vehicle;
    one of said wings extending from said pivot axis in a mounted position from the wheel box toward the road surface, the other of said wings extending from said pivot axis in said mounted position toward a running surface of a wheel of the vehicle so as to form a guarding part.

3. The splash guard as defined in claim 2, wherein each of said wings is provided with reinforcing ribs.

* * * * *

Disclaimer

4,928,994—*Fritz Buchner*, Mannheim, Fed. Rep. of Germany. MOTOR VEHICLE WATER AND MUD SPLASH GUARD. Patent dated May 29, 1990. Disclaimer filed Sept. 20, 1991, by inventor.

The term of this patent subsequent to July 29, 2004, has been disclaimed.
*[Official Gazette December 17, 1991]*

UNITED STATES PATENT AND TRADEMARK OFFICE
CERTIFICATE OF CORRECTION

PATENT NO. : 4,928,994
DATED : May 29, 1990
INVENTOR(S) : Fritz Buchner

It is certified that error appears in the above-indentified patent and that said Letters Patent is hereby corrected as shown below:

On the title page, item [22], insert the following claim of Priority:
--West German Application No. P 36 35 854.1 of October 22, 1986--.

Signed and Sealed this

Twenty-fourth Day of August, 1993

Attest:

BRUCE LEHMAN

*Attesting Officer*    *Commissioner of Patents and Trademarks*